United States Patent [19]

Ban

[11] Patent Number: 5,740,303
[45] Date of Patent: Apr. 14, 1998

[54] MAGNETIC RECORDING SYSTEM AND METHOD FOR A DIGITAL STILL VIDEO RECORDER

[75] Inventor: Young-Kyun Ban, Seoul, Rep. of Korea

[73] Assignee: SamSung Electronics Co., Ltd., Suwon, Rep. of Korea

[21] Appl. No.: 636,128

[22] Filed: Dec. 31, 1990

[30] Foreign Application Priority Data

Dec. 29, 1989 [KR] Rep. of Korea .................. 1989-20081

[51] Int. Cl.$^6$ .......................... H04N 5/225; H04N 5/228
[52] U.S. Cl. ................................ 386/38; 348/222
[58] Field of Search ........................ 358/310, 906, 358/909, 335, 342, 311, 539; 360/35.1; 369/19, 56, 58; 348/220, 222, 223; 386/117, 38; H04N 5/225

[56] References Cited

U.S. PATENT DOCUMENTS

| | | | |
|---|---|---|---|
| 4,837,628 | 6/1989 | Sasaki . | |
| 4,864,391 | 9/1989 | Taguchi | 358/80 |
| 4,916,682 | 4/1990 | Tomoda et al. | 369/32 |
| 4,959,735 | 9/1990 | Kawai | 358/342 |
| 4,989,078 | 1/1991 | Paxton | 358/88 |
| 5,040,068 | 8/1991 | Parulski et al. | 358/209 |

FOREIGN PATENT DOCUMENTS 63-62483  3/1988  Japan .
63-206074  8/1988  Japan .

*Primary Examiner*—Robert Crevalier
*Attorney, Agent, or Firm*—Robert E. Bushnell, Esq.

[57] ABSTRACT

There is disclosed a magnetic recording system for a digital still video recorder. The system includes a sensing unit 10 for sensing release timing data and white balance correction data and exposure data, a CPU 20 for generating control signals, an image sensing unit 40 for receiving image of object through a lens and for converting optical signal into the image signal and for amplifying the image signal, and then for performing chrominance separation, gamma correction and the white balance correction, an external image signal input unit 50 for separating R, G, B chrominance signals from composite image signal to amplify the R, G, B chrominance signals, and for separating synchronizing signals from the composite image signal so as to apply to the CPU 20, an input selection switch 60 for generating an input selection control signal, an input selection circuit 70 for selecting one image signal of the image signals which are generated from the image sensing unit 40 and the external image signal input unit 50, a digital signal processing unit 80 for converting and processing the image signal into digital image signal, a magnetic data recording unit 90 for recording the digital image signal on a disc and a display unit 100 for displaying a status of the magnetic data recording unit 90.

4 Claims, 4 Drawing Sheets

FIG. 4A

| Y11 | Y12 | Y13 | Y14 |
|---|---|---|---|
| Y21 | Y22 | Y23 | Y24 |
| Y31 | Y32 | Y33 | Y34 |
| Y41 | Y42 | Y43 | Y44 |

FIG. 4B

| RY11 | RY12 |  |  |
|---|---|---|---|
| RY21 | RY22 |  |  |
| RY31 | RY32 |  |  |
| RY41 | RY42 |  |  |

FIG. 4C

| BY11 |  | BY12 |  |
|---|---|---|---|
| BY21 |  | BY22 |  |
| BY31 |  | BY32 |  |
| BY41 |  | BY42 |  |

FIG. 5A

| Y11 | Y12 |  |  |
|---|---|---|---|
|  | Y21 | Y22 |  |
| Y31 | Y32 |  |  |
|  | Y41 | Y42 |  |

FIG. 5B

| RY11 | RY12 |  |  |
|---|---|---|---|
|  |  |  |  |
| RY31 | RY32 |  |  |
|  |  |  |  |

FIG. 5C

|  |  | BY22 |  |
|---|---|---|---|
| BY21 |  |  |  |
|  |  | BY42 |  |
| BY41 |  |  |  |

MAGNETIC RECORDING SYSTEM AND METHOD FOR A DIGITAL STILL VIDEO RECORDER

BACKGROUND OF THE INVENTION

The present invention relates to a digital still video recorder, and more particularly to a digital still video recording system for recording a still image signal on a magnetic recording medium, and a method therefor.

Generally, an electric camera which records an image signal of a still picture as analog signals on a rotary magnetic recording medium is used by employing a solid-state image sensor instead of a conventional still camera which takes a still picture according to a photo-sensitive effect of film. However, in electric cameras, since the data recorded on the rotary magnetic recording medium is an analog signal that is modulated by frequency modulation (FM), the electric camera has a drawback that the signal-to-noise ratio is easily degraded by means of the noise of in the transmission cable or by the storage status of the magnetic medium. Therefore, the electric camera which converts an image signal into a digital signal and records the digital signal on an IC (integrated circuit) memory card is used to overcome the above drawback.

FIG. 1 is a block diagram of a conventional digital still video recorder that converts image signals into digital signals and records the digital signals on a memory card 98 which is a recording medium. A sensing unit 10 senses release timing data and white balance correction data and exposure data. A central processing unit (hereinafter, referred to as CPU) 20 receiving an output of the sensing unit 10 generates an iris driving control signal, a driving signal generation control signal and a recording control signal. A driving signal generator 30 receiving the output of the CPU 20 generates a driving signal. An image sensing unit 40 converts images of an object which is received through a lens and an iris into an electrical image signal to, amplifies the electrical image signal, and performs chrominance separation gamma correction and white balance correction, according to the driving signal from the driving signal generator 30 and the iris driving control signal from the CPU 20.

A digital signal processing unit 80 receiving the image signal from the image sensing unit 40 converts the image signal into a digital image signal and processes the digital image signal in order to record the processed digital signal on a record medium. A data recording unit 95 records the processed digital image signal from the digital signal processing circuit 80 on a memory card 98 that is the recording medium, according to the recording control signal from the CPU 20.

Each component shown in the block diagram of FIG. 1 will be described hereinafter.

The sensing unit 10 includes a release switch 11 for generating the timing data to trigger taking photograph of an image, a white balance sensor 12 for generating the white balance data, and an exposure sensor 13 for generating the exposure data. The image sensing unit 40 includes a lens 41 for forming the image of the object, an iris 42 for controlling the amount of incidence light, an iris driver 43 for driving the iris 42 according to the iris driving control signal output from the CPU 20, a charge coupled device (hereinafter, referred to as a CCD) 44 for converting the image of the object that is received through the lens 43 and the iris 42 into the image signal, a CCD driver 45 for driving the CCD 44 according to the driving signal from the driving signal generator 30, a first amplifier 46 for amplifying the image signal from the CCD 44, and an image signal pre-processing circuit 47 receiving the amplified image signal from the first amplifier 46 and for performing the gamma correction and the white balance correction for separating the amplified image signal into R, G, B chrominance signals, according to the driving signal from the driving signal generator 30.

The digital signal processing unit 80 includes an analog-to-digital (hereinafter, referred to as A/D) converter 81 for converting the R, G, B chrominance signals from the image signal pre-processing circuit 47 into digital R, G, B chrominance signals, a signal processing circuit 82 for converting the digital R, G, B chrominance signals output from A/D converter 81 into a luminance signal Y and a chrominance signal C, a reduction filter 83 for reducing the luminance signal Y and the chrominance signal C from the signal processing circuit 82 in order to perform sub-sampling, a sub-sampling circuit 84 for sub-sampling the reduced luminance signal Y and chrominance signal C to reduce the number of sampling data by half, and a data compressing unit 85 receiving the sub-sampled sample data of the luminance signal Y and the chrominance signal C for compressing the number of the sample data into 4-bit or 2-bit data.

The data recording unit 95 includes a buffer memory 96 for storing the sample data of luminance signal Y and the chrominance signal from the data compressing circuit 85 in the digital signal processing unit 80, a memory interface 97 for addressing the addresses during the read/write operation according to the recording control signal from the CPU 20, and a memory card 98 for recording the sample data of the luminance signal Y and the chrominance signal C that are stored in the buffer memory 96 according to the addresses designated by the memory interface 92 during the read/write operation.

Hereinafter, the circuit operation of the conventional invention is described in detail.

In FIG. 1, when the system is supplied with a power source and a release switch 11 is switched for a first state, white correction data from the white balance sensor 12 and exposure data from the exposure sensor 13 are applied to the CPU 20. The CPU 20 applies the iris driving control signal to the iris driver 42 according to the exposure data, and the iris driver 42 drives the iris 43, so as to control the amount of incidence light which is applied through the lens 41. And an image of an object is formed at the CCD 44 and the optical signal is converted into the electrical image signals by CCD 44.

Meanwhile, the CPU 20 supplies the control signal for driving the driving signal generator 30 to the driving signal generator 30 according to the white balance correction data and the exposure data, so that the CCD driver 45 controls charge storage time of the CCD 44. In this case, when the release switch 11 is switched for a second state, the driving signal generator 30 respectively applies the driving signals, according to the control signal for controlling the driving signal generator 30, to the CCD driver 45, the first amplifier 46, the image signal pre-processing circuit 47 and the A/D converter 81. The image signal is applied to the CCD 44 according to driving of the release switch 11 and the image signal is converted to the electrical image signal, and the converted signal is amplified to a level at the first amplifier 46 and the amplified signal is applied to the image signal pre-processing circuit 47. The image signal pre-processing circuit 47 separates the amplified signal into R, G, B chrominance signals and performs gamma and white balance corrections, and then applies the R, G, B chrominance signals to the A/D converter 81 in parallel. The R, G, B chrominance signals are converted to digital R, G, B chrominance signals at the A/D converter 81 and then the digital R, G, B chrominance signals to the signal processing circuit 82 in parallel. The signal are applied processing circuit 82 converts the digital R, G, B chrominance signals to luminance signal Y and chrominance signal C. Also, the number of the samples of the chrominance signal is reduced by half and the reduced signals are applied to the reduction filter 83 for sub-sampling. In this case, the respective sampling data of the luminance signal Y and the chrominance signal C is linearly quantized into 8-bit digital signals. For example, the sampling data of the luminance signal Y may be represented as shown in FIG. 4A; the sampling data of R-Y chrominance signal in chrominance signal C as shown in FIG. 4B; and the sampling data of B-Y chrominance signal as shown in FIG. 4C.

However, the luminance signal Y and the chrominance C generated from the reduction filter 83 are applied to the sub-sampling circuit 84, and the luminance signal Y is sub-sampled as in FIG. 5A so that the number of samples is reduced to half compared with the number of samples in FIG. 4A, the R-Y chrominance signal of the chrominance signal C is sub-sampled every other line as shown in FIG. 5B so that the number of the samples is again reduced to half compared with the number of samples in FIG. 4B, and the B-Y chrominance signal is sub-sampled every other line as shown in FIG. 5C so that the number of the samples is again reduced to half compared with the number of samples in FIG. 4C. And, the sub-sampled luminance signal Y and chrominance signal C are applied to the data compressing circuit 85 so that the number of data bits of one sample is reduced.

Meanwhile, the data compression operation in the data compression circuit 85 is performed by way of discrete cosine transform (hereinafter, referred to as DCT) or delta pulse code modulation (hereinafter, referred to as DPCM). For example, when sample data of the luminance signal Y and chrominance signal C are compressed by employing DPCM that non-linearly compresses and quantizes the sample data by means of differences between sample data and the immediate preceding sample data, in the case of the luminance signal Y12, the difference between the luminance signal Y11 and Y12 is non-linearly quantized and each sample is comprised of 4 or 2 bits as shown in FIG. 5A. In similar way to the compression of luminance signal Y, the chrominance signals R-Y and B-Y are compressed and each sample of the luminance signal Y is comprised of 4-bit or 2-bit data.

The luminance and chrominance signals compressed from the data compression circuit 85 are stored in the buffer memory 96. And, when a predetermined amount of image data is completely stored into the buffer memory 96, the image data will be applied to the memory card 98. Here, the interface 97 designates the addresses of the buffer memory 96 and memory card 98 during read/write operation according to the recording control signal from the CPU 20.

The digital still video recorder which converts the image signal into the digital data and records the digital data in the memory card 98, as described in the foregoing discussion, can realize a high quality signal-to-noise ratio. However, it has a drawback because its applications are limited due to high cost of an IC memory card. Furthermore, it has another drawback that the digital still video recorder connected to an external image device cannot record the video signal received from the external image device on a recording medium.

SUMMARY OF THE INVENTION

Accordingly it is an object of the present invention to provide a digital still video recording system and a method for the same, for recording image signals generated from a CCD or image signals generated from an external image device at low cost, by maintaining a high quality of the signal-to-noise ratio while using a magnetic recording medium.

A magnetic recording system for a digital still video recorder includes: a sensing unit for sensing release timing data and white balance correction data and exposure data; a CPU for receiving output from the sensing unit and for generating an iris driving control signal, a driving signal generation control signal, a recording control signal, an input selection control signal, and a display control signal; a driving signal generator for receiving output from the CPU and for generating a driving signal; an image sensing unit for receiving an image of an object through a lens and for converting an optical signal into the image signal and for amplifying the image signal, and for then performing chrominance separation, gamma correction and the white balance correction, according to the iris driving control signal from the CPU and the driving signal from the driving signal generator; an external image signal input unit for separating R, G, B chrominance signals from a composite image signal signal to amplify the R, G, B chrominance signals, and for separating out synchronizing signals from the composite image signal and applying them to the CPU; an input selection switch for generating the input selection control signal; an input selection circuit for selecting and generating one image signal of the image signals which are generated from the image sensing unit and the external image signal input unit according to input selection control signal from the CPU; a digital signal processing unit for receiving the image signal from the input selection circuit and for converting the image signal into a digital image signal and for then processing the converted digital image signal, in order to record the image signal on a recording medium; a magnetic data recording unit for recording the digital image signal from the digital signal processing unit on a disc which is the recording medium according to the recording control signal output from the CPU; and a display unit for receiving a display control signal output from the CPU and displaying a status of the magnetic data recording unit.

BRIEF DESCRIPTION OF THE DRAWINGS

For a better understanding of the invention and to show how the same may be carried into effect, reference will now be made, by way of example, to the accompanying diagrammatic drawings, in which:

FIGS. 4A to 4C are sampling state diagrams of A/D converted image data; and

FIGS. 5A to 5C are sampling state diagrams of sub-sampled image data.

DESCRIPTION OF THE PREFERRED EMBODIMENTS

Hereinafter, a detailed description of the invention is given with reference to the drawings.

Figure 1:
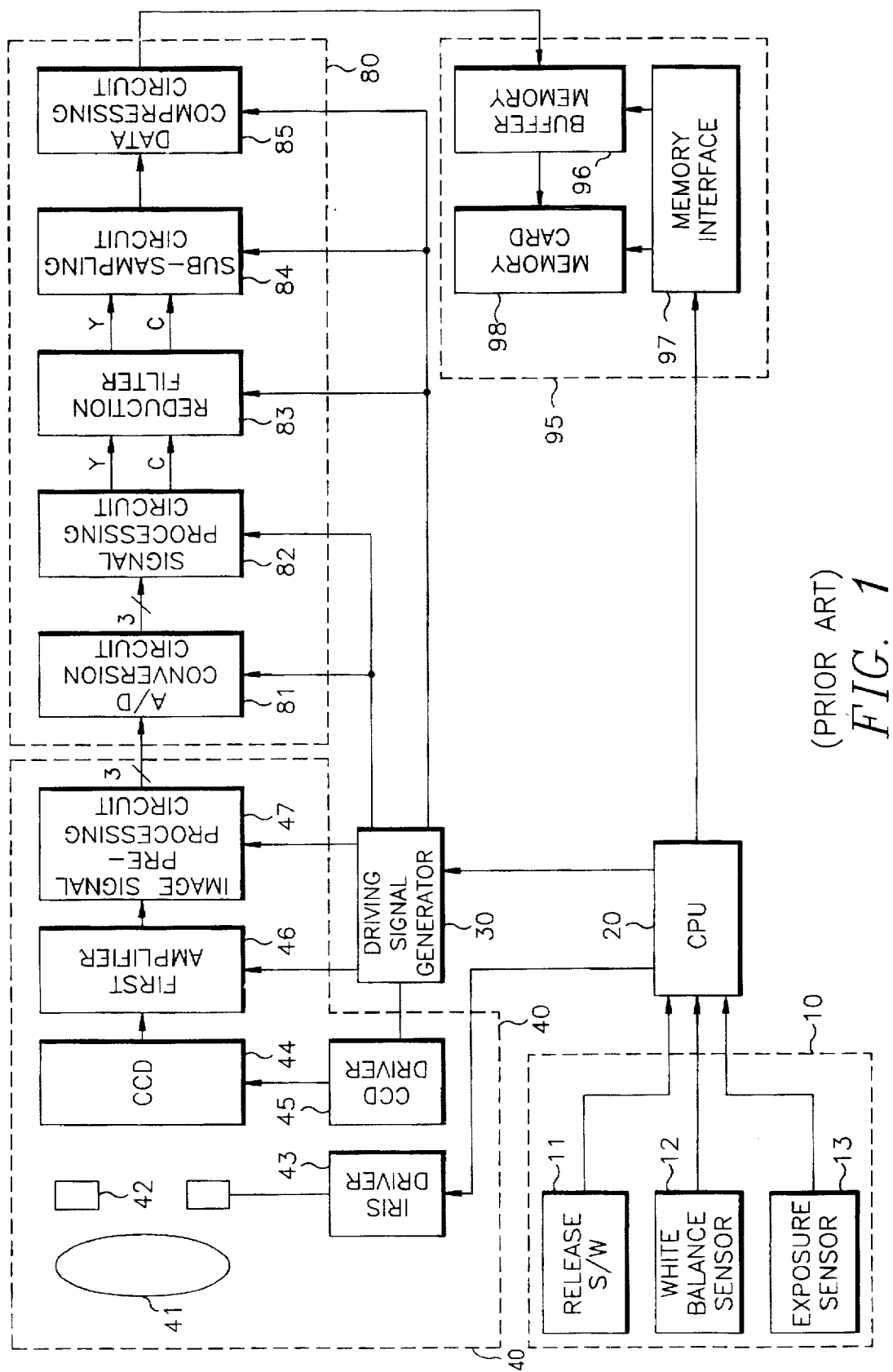
FIG. 1 is a block diagram of conventional a digital still video recording system.
Figure 2:
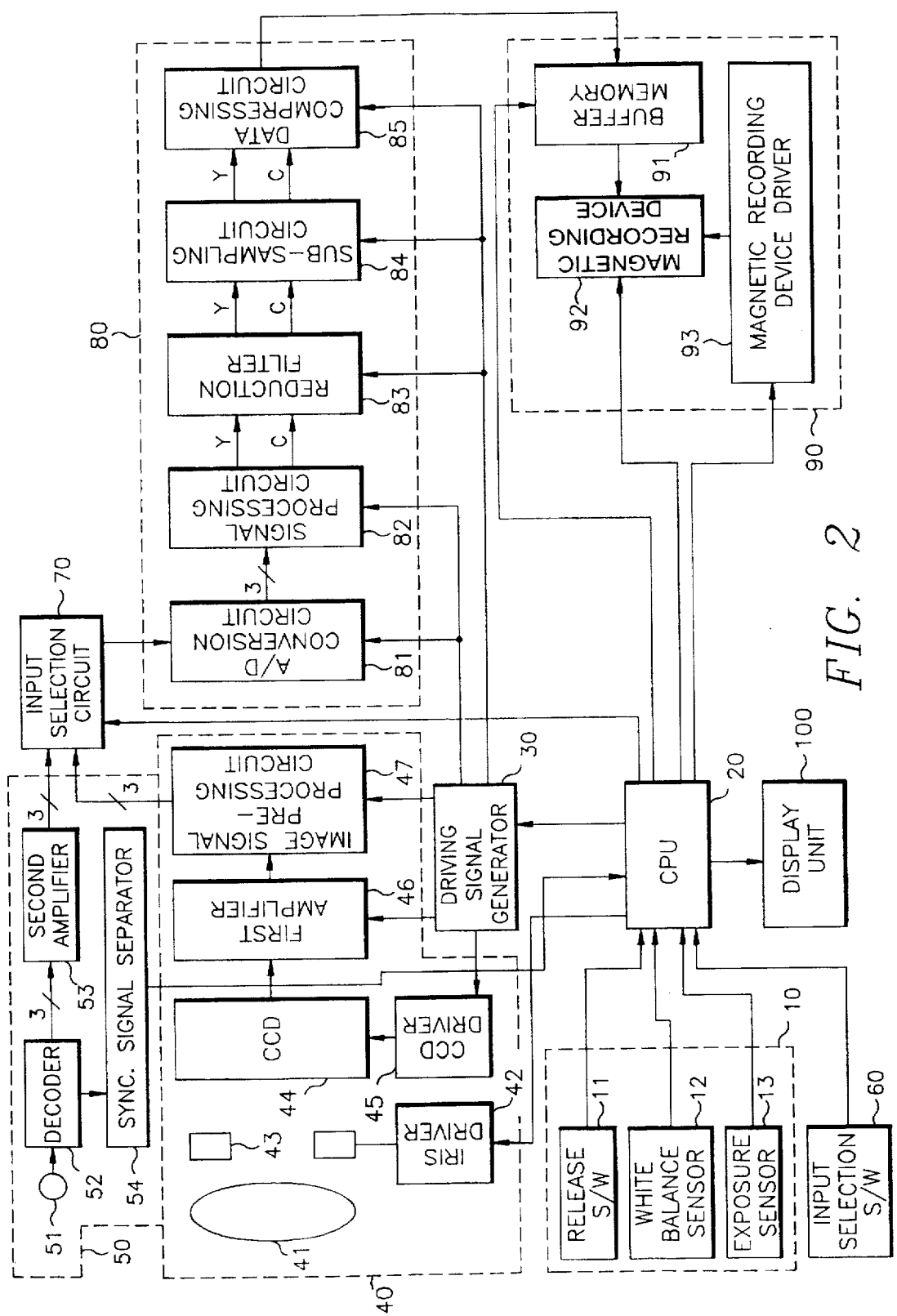
FIG. 2 is a block diagram a digital still video recording system according to the invention.

Referring to FIG. 2, the present system includes a sensing unit 10 for sensing release timing data and white balance correction data and exposure data. A CPU 20 receiving an output from the sensing unit 10 generates an iris driving control signal, a driving signal generator control signal, a recording control signal, an input selection control signal, and a display control signal. A driving signal generator 30 receiving an control signal output from the CPU 20 generates a driving signal.

An image sensing unit 40 receiving image of an object through a lens and converts the image of object to an image signal, converts the image signal into an electrical image signal to amplify the electrical image signal, and then performs chrominance separation, gamma correction and white balance correction in order to convert the image signal into a digital signal, according to the iris driving control signal from the CPU 20 and the driving signal from the driving signal generator 30. An external image signal input unit 50 separates and amplifies an image signal from an external image device into R,G,B chrominance signals to separate a synchronizing signal from the image signal, so as to apply the separated signal to the CPU 20. An input selection switch 60 generates the input selection control signal. An input selection circuit 70 selects one of the image signals generated by the image sensing unit 40 and the image signal input unit 50 according to input selection control signal from the CPU 20. A digital signal processing unit 80 receiving the image signal from the input selection circuit 70 converts the image signal into the digital image signal and processes the converted digital image signal in order to record the signal on a recording medium. A magnetic data recording unit 90 records the digital image signal from the digital signal processing unit 80 on a disc recording medium according to the recording control signal from the CPU 20. A display unit 100 receiving a display control signal from the CPU 20 displays a status of the magnetic data recording unit 90.

Referring to FIG. 2, the sensing unit 10 includes a release switch 11 for generating release timing data to trigger taking photograph of an image, a white balance sensor 12 for generating white balance data, and an exposure sensor 13 for generating exposure data.

The image sensing unit 40 includes a lens 41 for forming the image of the object, an iris 43 for controlling an amount of incidence light, an iris driver 42 for driving the iris 43 according to the iris driving control signal from the CPU 20, a CCD 44 for converting the image of the object that is formed through the lens 43 and the iris 43 into the image signal, a CCD driver 44 for driving the CCD 44 according to the driving signal from the driving signal generator 30, a first amplifier 46 for amplifying the image signal from the CCD 44, and an image signal pre-processing circuit 47 for receiving the image signal from the first amplifier 46, for separating the image signal into R, G, B chrominance signals, and for performing the gamma and white balance corrections according to the driving signal from the driving signal generator 30.

The external image input unit 50 includes a decoder 52 for separating the input signal received from the external image signal input terminal 51 into R,G,B chrominance signals, a second amplifier 53 for amplifying the R,G,B chrominance signals generated from the decoder 52, and a synchronizing signal separator 54 for separating a synchronizing signal from the image signal received from the external image signal input terminal 51 and applying the separated synchronizing signal to the CPU 20.

The digital signal processing unit 80 includes an A/D converter 81 for converting the analog R, G, B chrominance signals which are generated from the image signal pre-processing circuit 47, into digital R, G, B chrominance signals, a signal processing circuit 82 for receiving the digital R, G, B chrominance signals from the A/D converter 81 and for converting the digital signals into luminance signal Y and chrominance signal C, a reduction filter 83 for receiving and reducing the luminance signal Y and the chrominance signal C generated from the signal processing circuit 82 for sub-sampling, a sub-sampling circuit 84 for sub-sampling the reduced luminance signal Y and chrominance signal C to reduce the data by half, and a data compressing circuit 85 for receiving the sample data of luminance signal Y and chrominance signal C to compress the sample data of 4-bit or 2-bit data.

A magnetic data recording circuit 90 includes a buffer memory 91 for storing the reduced data of luminance signal Y and chrominance signal C compressed at the data compressing circuit 85, a magnetic recording device 92 for recording the luminance signal Y and chrominance signal C data of the buffer memory 91 on a disc according to the recording control signal from the CPU 20, and a magnetic recording device driver 93 for controlling the magnetic recording device 92 according to the recording control signal from the CPU 20.

Figure 3:
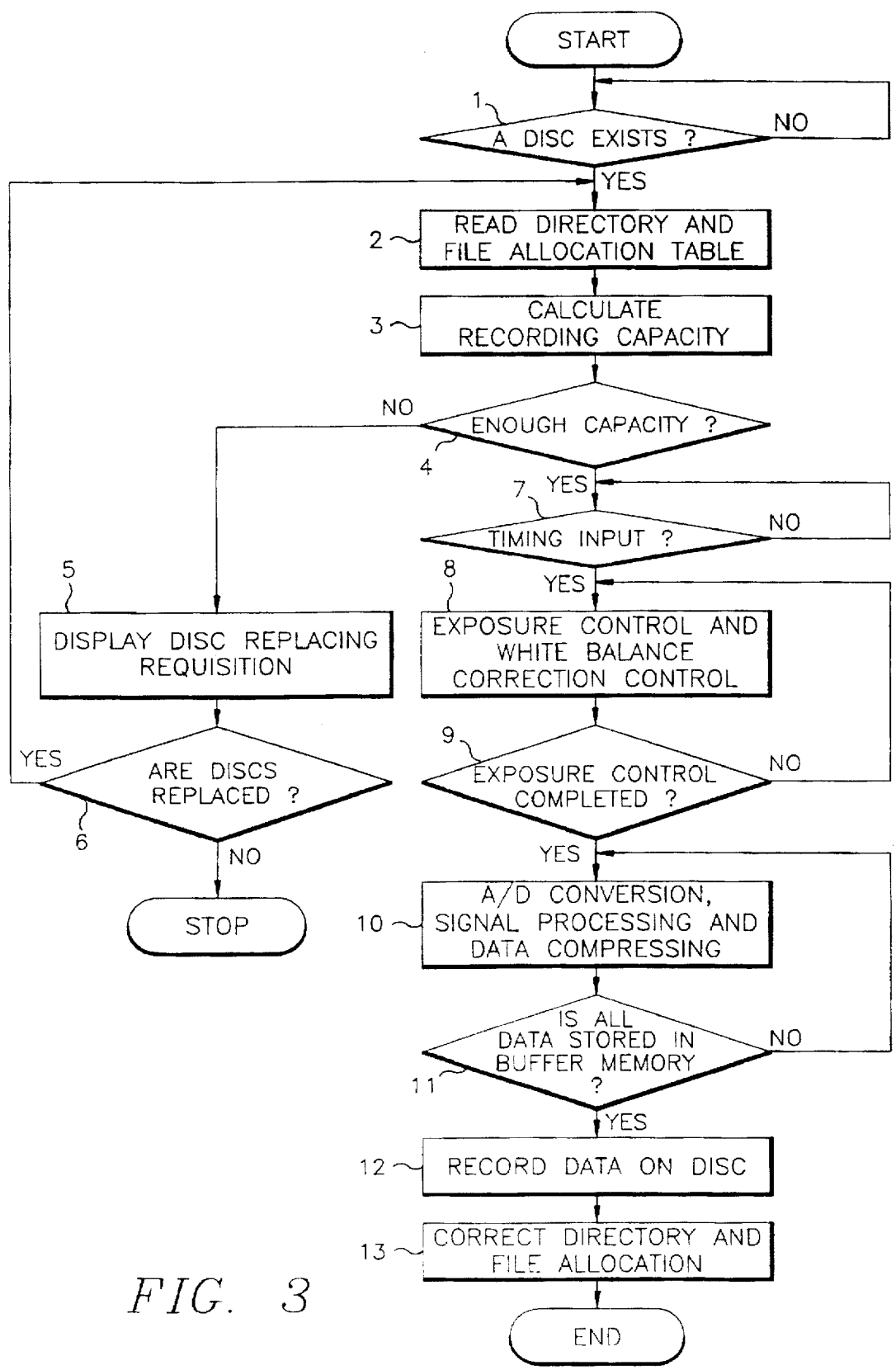
FIG. 3 is a flow diagram of the digital still video recording system according to the invention.

FIG. 3 is a flow diagram of the digital still video recording system according to the present invention.

FIG. 4A illustrates 8-bit digital luminance signals Y11-Y44 from the signal processing circuit 82 in which each of the above digital luminance signals represents a linearly quantized sampling point of an analog luminance signal Y. FIG. 4B illustrates 8-bit digital chrominance signals RY11-RY42 of the chrominance signal C from the signal processing circuit 82 in which each of the digital chrominance signals represents a linearly quantized sampling point of an analog chrominance signal R-Y and the number of samples of the above digital chrominance signals is reduced to half. FIG. 4C illustrates 8-bit digital chrominance signals BY11-BY42 of the chrominance signal C output from the signal processing circuit 82 in which each of the digital chrominance signals represents a linearly quantized sampling point of an analog chrominance signal B-Y and the number of samples of the above digital chrominance signals is reduced by half. FIG. 5A illustrates the sub-sampled luminance signal Y11-Y42 from the sub-sampling circuit 84 in which the number of samples is reduced by half compared with the original number of samples as shown in FIG. 4A. FIG. 5B illustrates the chrominance signal RY11-RY32 of the chrominance signal C which is sub-sampled every other line by the sub-sampling circuit 84 so that the number of the samples is again reduced by half compared with the original number of samples as shown in FIG. 4B. FIG. 5C illustrates the chrominance signal BY21-BY41 of the chrominance signal C which is sub-sampled every other line by the sub-sampling circuit 84 so that the number of the samples is again reduced by half compared with the original number of samples as shown in FIG. 4C.

Hereinafter, an circuit operation according to the present invention is described in detailed with reference to the drawings.

Referring to FIG. 2, when the system is supplied with the power source and a release switch 11 is switched to a first state, the release timing data from the release switch 11, the white balance data from the white balance sensor 12 and exposure data from the exposure sensor 13 are applied to CPU 20. The CPU 20 applies the iris driving signal to the iris driver 42 according to the exposure data, and the iris driver 42 drives the iris 43 to control an amount of incident light which is applied through the lens 41. The CCD 44 converts optical signal which is formed through the lens 41 and iris 42 into the image signal.

Meanwhile, the CPU 20 applies the driving signal generation control signal to the driving signal generator 30 according to the white balance data and the exposure data, so that the CCD driver 45 controls the charge storage time of the CCD 44. In this case, when the release switch 11 is switched to a second state, release timing data is applied to CPU 20 and the driving signal generator 30 respectively applies the driving signals, according to the driving signal generation control signal, to the CCD driver 45, the first amplifier 46, the image signal pre-processing circuit 47 and the A/D converter 81. With the driving of the release switch 11, the image signal is generated at the CCD 44 according to driving of the release switch and the image signal is amplified to a predetermined level by the first amplifier 46 and the amplified image signal is applied to the image signal pre-processing circuit 47. The image signal pre-processing circuit 47 separates the image signal into R, G, B chrominance signals, performs gamma and white balance corrections, and then, applies the signals in parallel, to the input selection circuit 70.

Meanwhile, when an external image signal is received through an external image signal input terminal 71 of the image signal input unit 50 which is coupled to an external image device, the image signal is separated into R,G,B chrominance signals by the decoder 52 and the separated signals are amplified by the second amplifier 53, and the amplified image signals are, in parallel, applied to the input selection circuit 70. The synchronizing signal separator 54 receiving the image signal separates synchronizing signal from the image signal to apply to the CPU 20.

In this case, when an user manipulates input selection switch 60 and selects one of signals generated from the image sensing unit 40 or the external image signal input unit 50, the CPU 20 applies the input signal selection control signal to the input selection circuit 70 according to the state of the input selection switch 60, so that the input selection circuit 70 selects one of the R, G, B chrominance signals which are generated from the image sensing unit 40 and from the external image signal input circuit 51 and applies the selected R, G, B chrominance signals to the A/D converter 81. When image signal from the external image signal input circuit 50 is selected by the input selection circuit 70, the CPU 20 synchronizes with the synchronizing signal from the synchronizing separator 54 of the external image signal input unit 50 and then applies the driving signal generation control signal to the driving signal generator 30.

The A/D converter 81 converts the R, G, B chrominance signals, in parallel, from the input selection circuit 70 into the digital R, G, B chrominance signals and applies the digital R, G, B chrominance signals to the signal processing circuit 82. The digital R, G, B chrominance signals are converted into the digital luminance signal Y and chrominance signals R-Y and B-Y by the signal processing circuit 82. The number of samples of the chrominance signals are reduced by half and applied to the reduction filter 83 for sub-sampling. In this case, the respective sampling data of the luminance signal Y and the chrominance signal C are linearly quantized 8-bit digital data, the sampling of the luminance signal Y is as shown in FIG. 4A, sampling of R-Y chrominance signal of chrominance signal C is as shown FIG. 4B, and sampling of B-Y chrominance signal is as shown in FIG. 4C.

The luminance signal Y and the chrominance signal C which are generated from the reduction filter 83 are applied to the sub-sampling circuit 84, and therein the luminance signal Y is sub-sampled as shown in FIG. 5A so that the number of samples is reduced by half compared with the original number of samples as shown in FIG. 4A, the chrominance signal R-Y of the chrominance signal C is sub-sampled every other line as shown in FIG. 5B so that the number of samples are again reduced to half compared to the number of samples as shown in FIG. 4B, and the B-Y chrominance signal of the chrominance signal C is sub-sampled every other line as shown in FIG. C so that the number of samples are again reduced by half compared to the number of samples as shown in FIG. 4C. Thus, the sub-sampled luminance signal Y and the chrominance signal C are applied to the data compressing circuit 85 to reduce the number of data bits for each sample.

Meanwhile, the data compression operation of the data compression circuit 85 is performed by way of DCT or DPCM. For example, when sample data of the luminance signal Y and chrominance signal C are compressed by employing DPCM that compresses and non-linearly quantizes the sample data by means of the difference between sample data and preceding sample data, in case of the luminance signal Y12, the difference between the luminance signals Y11 and Y12 is non-linearly quantized and each sample is comprised of 4 or 2 bits. The R-Y chrominance signal and B-Y chrominance signal are compressed as the luminance signal and each sample data is comprised of 4 or 2 bits.

The luminance and chrominance signals compressed at the data compression circuit 85 are stored in a buffer memory 96. When a predetermined amount of image data has been stored into the buffer memory 91, the magnetic recording device driver 93 controls magnetic recording device 92 according to the recording control signal from the CPU 20, and the magnetic recording circuit 92 records the image data stored in the buffer memory 91 onto the disc which is the recording medium, according to the recording control signal from the CPU 20. In this case, the disc capacity is insufficient to record the image data, a display control signal from the CPU 20 is applied to a display unit 100 which displays a message indicating disc replacement, so that the user can change the disc.

Meanwhile, in step 1 of FIG. 3, the CPU 20 detects the presence of a disc recording medium in the magnetic recording circuit 92 of the magnetic recording unit 90 as shown in FIG. 2 and proceeds to step 2 if a disc is present. If there is no disc present in the step 1, the CPU 20 repeatedly performs the step 1 until a disc is detected. In the step 2, the CPU 20 controls the magnetic recording device 92 and the magnetic recording device driver 93 of FIG. 2 to read the directory and file allocation table, and then proceeds to step 3. In the step 3, recording capacity of the disc is calculated by the magnetic recording device 92 and then proceeds to step 4 to determine whether there is enough space to record a predetermined digital image signal on the disc the CPU 20. When there is enough capacity left in the disc the CPU 20, proceeds to step 7 and determines whether or not release timing data is applied from the release switch 11 of FIG. 2, and if release timing data is not applied, the procedure repeatedly performs the step 7.

In the step 7, when the release timing data is applied to the CPU 20, the CPU 20 proceeds to step 8 to receive the white balance correction data and exposure data from the white balance sensor 12 and the exposure sensor 13. Therefore, the CPU 20 applies the iris driving signal to the iris driver 42 according to the exposure data and the iris driver 42 drives the iris 43 so as to control an amount of incident light received through the lens 41. The CPU 20 applies the driving signal generation control signal to the drive signal generator 30 according to the white balance correction data and controls the white balance correction in the pre-processing unit circuit 47 and then proceeds to step 9. The CPU 20 checks whether or not the exposure control is being completed in step 9, and if not, proceeds to the step 8 and repeatedly performs the loop. Whereas, if exposure control is completed in the step 9, the procedure proceeds to step 10. In the step 10, the CPU 20 applies the driving signal generation control signal to the driving signal generator 30 to control conversion of the R, G, B chrominance signals applied to the digital signal processing unit 80, according to the driving signal, to the digital R, G, B chrominance signals. Reduction filtering and sub-sampling of the digital R, G, B signals after is performed after separating them into luminance signals Y and chrominance signals C. The sub-sampled luminance signal Y and chrominance signal C signals are compressed and then proceeds to step 11 to determine whether all data is stored in the buffer memory 91, and if not, proceeds to the step 11 and performs the loop.

If all data is stored in the step 11, step 12 is performed and the recording control signal is applied to the buffer memory 91, the magnetic recording device driver 93 and the magnetic recording device 92 records the data stored in the buffer memory 91 on the disc and proceeds to step 13. In step 13, the directory and the file allocation table of the disc are up-dated and then all procedures are ended.

Meanwhile, the disc is checked to determine if there is enough capacity left as in step 4, if the space is insufficient, step 5 is performed. In step 5, the display control signal is applied to the display unit 100 and disc replacing requisition is displayed thereon and then step 6 is performed. In step 6, if discs were replaced in the magnetic recording device 92, the procedure goes back to the step 2. And if discs were not replaced in step 6, the procedure stops.

As stated in the foregoing, the present invention relates to a system and method for low cost recording of photographed image signals or image signals inputted from an external image circuit by maintaining high quality signal-to-noise ratio using magnetic recording medium in a digital still video camera.

While the invention has been particularly shown and described with reference to a preferred embodiment, it will be understood by those skilled in the art that modifications in detail may be made without departing from the spirit and scope of the invention.

What is claimed is:

1. A magnetic recording system for a digital still video recorder, said system comprising:

sensing means for generating release timing data, white balance correction data and exposure data in response to user control and detected image characteristics;

controlling means for receiving said release timing data, said white balance correction data, and said exposure data from the sensing means and for generating iris driving control signals, driving signal generation control signals, recording control signals, and display control signals;

driving signal generating means for receiving said driving signal generation control signals from said controlling means and for generating driving signals;

still image sensing means for receiving images of an object through a lens as optical signals, said still image sensing means comprising:

means for converting said optical signals into internally-generated still image signals;

means for amplifying the internally-generated still image signals; and means for performing chrominance separation, gamma correction and white balance correction according to said iris driving control signals from said controlling means and the driving signals from the driving signal generating means to generate red, green and blue internal still chrominance signals;

external image signal input means for receiving externally-generated composite image signals, said external image signal input means comprising:

decoder means for separating red, green and blue external chrominance signals from the externally-generated composite image signals;

amplifier means for amplifying the red, green and blue external chrominance signals received from said decoder means; and separator means for separating synchronizing signals from said externally-generated composite image signals, said synchronizing signals being input to said controlling means, said controlling means generating said driving signal in response to said synchronizing signals, and said externally-generated composite image signals being received from an external source at said external image signal input terminal;

input switching means for generating first input selection control signals, said controlling means receiving said first input selection control signals and for generating second input selection control signals in response to said first input selection control signals;

input selection means for selecting and providing one of the red, green and blue internal still chrominance signals generated from said still image sensing means and said red, green and blue external chrominance signals from said external image signal input means as selected still image signals, according to said second input selection control signals;

digital signal processing means for receiving the selected still image signals from said input selection means, for converting said selected still image signals into digital still image signals and for processing said digital still image signals in preparation for recording on a recording medium;

magnetic data recording means for recording the digital still image signals processed by said digital signal processing means on a disc according to the recording control signals; and display means for receiving said display control signals and display a status of said magnetic data recording means.

2. A magnetic recording system for a digital still video recorder as claimed in claim 1, wherein said external image signal input means comprises:

decoder means for separating said red, green and blue external chrominance signals from the externally-generated composite image signals received at an external image signal input terminal;

amplifier means for amplifying the red, green and blue external chrominance signals from said decoder; and separator means for separating the synchronizing signals from the externally-generated composite image signals received from said external image signal input terminal.

3. A magnetic recording system for a digital still video recorder, comprising:

sensing means for generating release timing data, white balance correction data and exposure data in response to detected image characteristics;

controlling means for generating iris driving control signals, driving signal generation control signals, recording control signals, and display control signals in dependence upon said release timing data, said white balance correction data and said exposure data;

driving signal generating means for generating driving signals in dependence upon said driving signal generation control signals;

image sensing means for receiving images of an object through a lens as optical signals, for converting said optical signals into internal still image signals, said image sensing means comprising:

means for amplifying the internal still image signals;

means for performing chrominance separation, gamma correction and the white balance correction according to said iris driving control signals and the driving signals to generate red, green and blue internal chrominance signals;

external image signal input means for receiving external image signals from an external source, said external image signal input means comprising:

decoder means for separating red, green and blue external chrominance signals from the external image signals;

amplifier means for amplifying the red, green and blue external chrominance signals; and separator means for separating synchronizing signals from said the external image signals and providing said synchronizing signals to said controlling means, said controlling means generating said driving signal generation control signals in response to said synchronizing signals;

input selection switching means for generating input selection signals, said controlling means being responsive to said input selection signals for generating input selection control signals;

input selection circuit means for providing one of the red, green and blue internal chrominance signals from said image sensing means and red, green and blue external chrominance signals from said external image signal input means as red, green and blue selected chrominance signals in accordance with said input selection control signals;

digital signal processing means for receiving the red, green and blue selected chrominance signals from said input selection circuit means, for converting said red, green and blue selected chrominance signals into digital image signals, and for processing said digital image signals in preparation for recording on a recording medium; and magnetic data recording means for recording the digital image signals;

said controlling means for determining when a disc is present in said magnetic data recording means, for determining whether the disc has available capacity for recording said digital image signals, for displaying a disc replacement message and checking for disc replacement if said disc has an inadequate capacity, and, if available capacity is adequate, for updating directory and file allocation information of said disc and controlling the recording of the digital image signals.

4. A recording method for a digital still video recorder, said method comprising the steps of:

receiving an externally applied video signal;

separating a synchronization signal from said externally applied video signal;

separating said externally applied video signal into red, green and blue external chrominance signals;

outputting said red, green and blue external chrominance signals in parallel;

receiving an image through lens and converting said image to an image signal;

separating said image signal into red, green and blue internal chrominance signals;

activating an input selection switch to generate a selection signal;

generating a switching control signal in response to said selection signal;

selecting for input, said red, green and blue external chrominance signals or said red, green and blue internal chrominance signals, to an analog-to-digital conversion circuit, said analog-to-digital conversion circuit being response to a driving signal generated by a driving signal generator, said driving signal generator being responsive to driving control signals generated by a central processing unit;

converting said red, green and blue internal chrominance signals to first digital red, green and blue chrominance signals, in response to said driving signal when said selecting step selects said red, green and blue internal chrominance signals for input;

controlling generation of said driving control signals in response to said synchronization signal for generating said driving signal for converting said red, green and blue external chrominance signals to second digital red, green and blue chrominance signals, when said selecting step selects said red, green and blue external chrominance signals for input;

convening said first or second digital red, green and blue chrominance signals into a luminance signal and a chrominance signal; and recording said luminance and chrominance signals on a recording medium.

* * * * *